United States Patent
Song

(10) Patent No.: US 12,027,751 B2
(45) Date of Patent: *Jul. 2, 2024

(54) ANTENNA DEVICE AND ANTENNA CONTROLLING METHOD

(71) Applicant: Nanning FuLian FuGui Precision Industrial Co., Ltd., Nanning (CN)

(72) Inventor: Ai-Ning Song, Shenzhen (CN)

(73) Assignee: Nanning FuLian FuGui Precision Industrial Co., Ltd., Nanning (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/242,822

(22) Filed: Sep. 6, 2023

(65) Prior Publication Data

US 2023/0411822 A1  Dec. 21, 2023

Related U.S. Application Data

(63) Continuation of application No. 17/516,843, filed on Nov. 2, 2021, now Pat. No. 11,804,644.

(30) Foreign Application Priority Data

Apr. 29, 2021  (CN) .......................... 202110474653.3

(51) Int. Cl.
  *H01Q 1/12*  (2006.01)
  *H04B 17/318*  (2015.01)

(52) U.S. Cl.
  CPC ......... *H01Q 1/1257* (2013.01); *H04B 17/318* (2015.01)

(58) Field of Classification Search
  CPC .......................... H01Q 1/1257; H04B 17/318
  See application file for complete search history.

(56) References Cited

U.S. PATENT DOCUMENTS

| | | |
|---|---|---|
| 6,816,121 B1 | 11/2004 | Cheng et al. |
| 2015/0349417 A1 | 12/2015 | Richards et al. |
| 2020/0200853 A1 | 6/2020 | Horimoto et al. |
| 2021/0050660 A1 | 2/2021 | Anderson |
| 2021/0226650 A1* | 7/2021 | Zhao ................... H04B 7/0408 |
| 2022/0085868 A1* | 3/2022 | Facca ...................... H01Q 3/04 |

FOREIGN PATENT DOCUMENTS

| | | |
|---|---|---|
| CN | 1980071 A | 6/2007 |
| CN | 105811075 A | 7/2016 |
| CN | 111026167 A | 4/2020 |
| TW | 201424128 A | 6/2014 |

* cited by examiner

*Primary Examiner* — Junpeng Chen
(74) *Attorney, Agent, or Firm* — ScienBiziP, P.C.

(57) ABSTRACT

An antenna device, applied to an electronic device and the antenna device includes: an antenna unit, configured to transmit and receive signals; a rotation unit, connected to the antenna unit, and configured to rotate the antenna unit when the electronic device is powered on, record a signal strength in preset angle for each rotation and generate an angle and signal strength mapping table, and further configured to rotate the antenna unit to a position with a strongest signal according to the angle and signal strength mapping table, which realizes automatic adjustment of antenna direction to optimize antenna performance.

8 Claims, 2 Drawing Sheets

ANTENNA DEVICE AND ANTENNA CONTROLLING METHOD

CROSS-REFERENCE TO RELATED APPLICATIONS

This application claims priority to Chinese Patent Application No. 202110474653.3 filed on Apr. 29, 2021, the contents of which are incorporated by reference herein.

FIELD

The present disclosure relates to a field of communication technology, in particular to an antenna device and an antenna controlling method.

BACKGROUND

In recent years, with the development of science and technology, functions of terminal equipment, such as 5G terminal equipment, are becoming more powerful, and requirements for the antenna of terminal equipment are becoming higher. For example, the 5G millimeter wavelength is short, and fading of such waves can easily occur during transmissions. It is difficult for a single antenna to achieve long-distance transmission. The matrix antenna is usually designed. The signal receiving limitation caused by the high directivity of the millimeter wave matrix antenna has become problematic.

DETAILED DESCRIPTION

Figure 1:
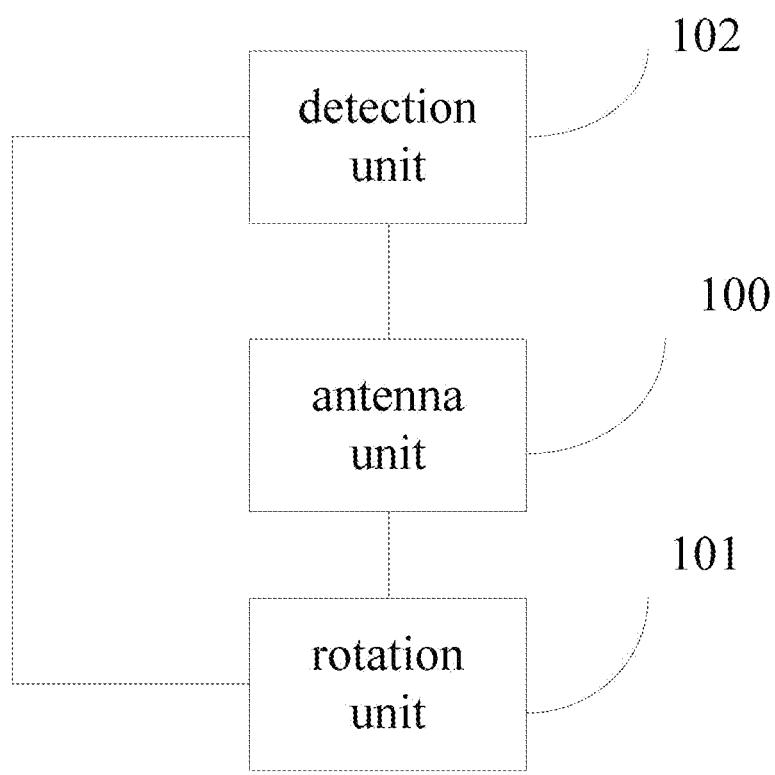
FIG. 1 is a schematic module diagram illustrating an antenna device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Referring to FIG. 1, FIG. 1 is a schematic module diagram of an embodiment of an antenna device 10 of the present invention. In the embodiment, the antenna device 10 is applied to an electronic device. The electronic device can be, but not limited to, notebooks, routers, mobile phones, etc.

In the embodiment, the antenna device 10 comprises an antenna unit 100 and a rotation unit 101. The antenna unit 100 is a millimeter wave matrix antenna for transmitting and receiving signals. The rotation unit 101 is electrically connected to the antenna unit 100, and the rotation unit 200 is configured to rotate the antenna unit 101 when the electronic device is powered on. The rotation unit 200 is further configured to record signal strength in rotation preset angle for each direction and generate an angle and signal strength mapping table. The rotation unit 200 is further configured to rotate the antenna unit 100 to a position with a strongest signal according to the angle and signal strength mapping table. For example, the signal strength is recorded every 30 rotation angle, so as to generate a mapping table of different signal strengths corresponding to different angles, compare the collected signal strength, and rotate to a corresponding angle direction.

In the embodiment, the antenna device 10 also includes a detection unit 102. The detection unit 102 includes a gyroscope that senses an angle change of the antenna unit 100. The detection unit 102 is electrically connected to the antenna unit 100 and the rotation unit 101, to detect whether the angle of the antenna unit 100 changes. When the detection unit 102 detects that the change angle of the antenna unit 100 is greater than a set angle, it re-rotates the antenna unit 100 to an angle with the strongest signal according to the angle and signal strength mapping table. Specifically, when the electronic device is continuously powered on, the user rotates or moves the electronic device, and when the detection unit 102 detects that the change angle of the antenna unit 100 is greater than a first preset value, such as 15 degrees, the rotation unit 101 rotates the antenna unit 100 to an angle with the strongest signal according to the angle and signal strength mapping table.

In the embodiment, the detection unit 102 is further configured to detect the signal strength of the antenna unit 100. When the signal strength drops below the first preset value, the rotating antenna unit 100 re-records the signal strength in preset angle for each rotation to generate the angle and signal strength mapping table, and rotates the antenna unit 100 to the position with the strongest signal. Specifically, when there are obstructions around the electronic device or the network environment of the base station changes, the signal strength of the antenna unit 100 may become worse. In a specific embodiment, when the signal strength decreases by more than 19 dB, the rotation unit 101 will re-record the signal strength in preset angle for each rotation, and rotate the antenna unit 101 to generate the angle and signal strength mapping table.

In the embodiment, the detection unit 102 is further configured to detect a state of the electronic device and restart the electronic device when the vibration amplitude of the electronic device is greater than a second preset value. When the electronic device is restarted, the rotation unit 101 rotates the antenna unit 100 to re-record the signal strength in preset angle for each rotation and generate the angle and signal strength mapping table, and then rotates the antenna unit 100 to the angle with the strongest signal.

In the embodiment, the detection unit 102 is further configured to preset verification time. The rotation unit 101 is further configured to rotate the antenna unit 100 to re-record the signal strength in preset angle for each rotation after reaching the verification time, and rotate the antenna unit 100 to the angle with the strongest signal. Specifically, by setting the verification time, the direction of the antenna unit 100 can be verified regularly, so as to avoid unknown abnormalities caused by long-term non-updating, and ensure the working performance of the antenna unit 100.

Figure 2:
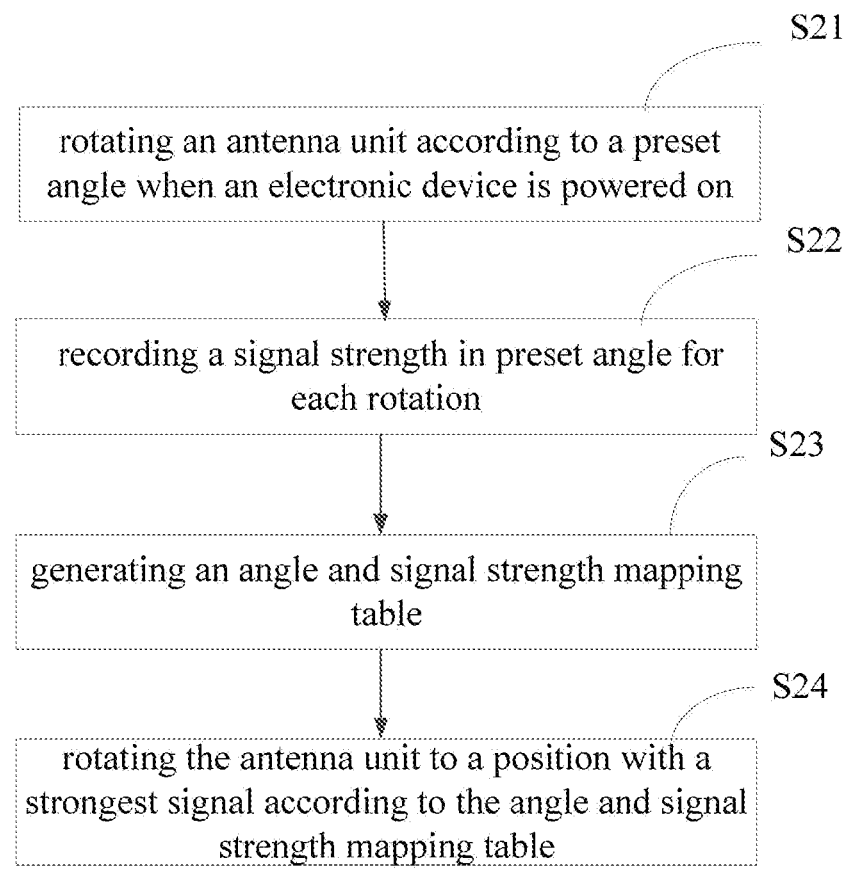
FIG. 2 is a flow diagram illustrating an antenna controlling method according to an embodiment of the present disclosure.

Referring to FIG. 2, FIG. 2 is a flow diagram of an embodiment of the antenna control method. The antenna controlling method is applied to the antenna device 10. In the present embodiment, the antenna controlling method comprises the following steps:

Step S21: rotating an antenna unit according to a preset angle when an electronic device is powered on;

Step S22: recording a signal strength in preset angle for each rotation.

In a specific embodiment, the preset angle is set to 30 degrees, and the signal strength is recorded every 30 rotation angle.

Step S23: generating an angle and signal strength mapping table.

Step S24: rotating the antenna unit to a position with a strongest signal according to the angle and signal strength mapping table.

In the embodiment, the antenna controlling method further comprises the following steps: detecting whether the angle of the antenna unit 100 changes; re-rotating the antenna unit 100 to the angle with the strongest signal according to the angle and signal strength mapping table when it is detected that a change angle of the antenna unit 100 is greater than a set angle.

Specifically, when the electronic device is continuously powered on, the user rotates or moves the electronic device, and when the detection unit 102 detects that the change angle of the antenna unit 100 is greater than a first preset value, such as 15 degrees, the rotation unit 101 rotates the antenna unit 100 to an angle with the strongest signal according to the angle and signal strength mapping table.

In the embodiment, the antenna controlling method further comprises the following steps: detecting the signal strength of the antenna unit; re-recording the signal strength in preset angle for each rotation when the signal strength drops belowa first preset value, and generating the angle and signal strength mapping table, and rotating the antenna unit to the angle with the strongest signal.

Specifically, when there are obstructions around the electronic device or the network environment of the base station changes, the signal strength of the antenna unit 100 may become worse. In a specific embodiment, when the signal strength decreases by more than 19 dB, the rotation unit 101 will re-record the signal strength in preset angle for each rotation, and rotate the antenna unit 101 to generate the angle and signal strength mapping table.

In the embodiment, the antenna controlling method further comprises the following steps: detecting a state of the electronic device; restarting the electronic device when a vibration amplitude of the electronic device is greater than a second preset value; rotating the antenna unit to re-record the signal strength in preset angle for each rotation, and generating the angle and signal strength mapping table; rotating the antenna unit to the angle with the strongest signal.

In the embodiment, the antenna controlling method further comprises the following steps: presetting verification time; rotating the antenna unit after reaching the verification time to re-record the signal strength in preset angle for each rotation, and generating the angle and signal strength mapping table; rotating the antenna unit to the angle with the strongest signal.

Compared with the prior art, the antenna device provided by the embodiment of the present invention records the signal strength in the preset angle direction for each rotation by rotating the antenna unit and generates the angle and signal strength mapping table, so as to rotate the antenna unit to the position with the strongest signal according to the angle and signal strength mapping table, to automatically adjust the antenna direction and optimize the antenna performance.

Many details are often found in the art such as the other features of a mobile terminal. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna device applicable in an electronic device, comprising:
   an antenna unit configured to transmit and receive signals;
   a rotation unit connected to the antenna unit; and
   a detection unit connected to the antenna unit and the rotation unit,
   wherein the detection unit is configured to restart the electronic device when a vibration amplitude of the electronic device is greater than a second preset value, and
   the rotation unit is configured to rotate the antenna unit to record a signal strength in a first preset angle for each rotation, generate an angle and signal strength mapping table, and rotate the antenna unit to an angle with a strongest signal according to the angle and signal strength mapping table after the electronic device is restarted.

2. The antenna device according to claim 1, wherein:
   the detection unit is further configured to detect whether an angle of the antenna unit has changed to a new angle, and
   the rotation unit is further configured to rotate the antenna unit to the angle with the strongest signal according to the angle and signal strength mapping table when the detection unit detects that the new angle of the antenna unit is greater than a second preset value.

3. The antenna device according to claim 1, wherein:
   the detection unit is further configured to detect a current signal strength of the antenna unit, and
   the rotation unit is further configured to rotate the antenna unit to record the signal strength in the preset angle for each rotation when the current signal strength drops below a first preset value, update the angle and signal strength mapping table, and rotate the antenna unit to the angle with the strongest signal according to the updated angle and signal strength mapping table.

4. The antenna device according to claim 1, wherein:
the detection unit is further configured to preset a verification time, and
the rotation unit is further configured to rotate the antenna unit after the verification time is reached to re-record the signal strength in the preset angle for each rotation, update the angle and signal strength mapping table, and rotate the antenna unit to the angle with the strongest signal according to the updated angle and signal strength mapping table.

5. An antenna controlling method, comprising:
restarting an electronic device when a vibration amplitude of the electronic device is greater than a second preset value; and
rotating an antenna unit of the electronic device to record a signal strength in a first preset angle for each rotation, generating an angle and signal strength mapping table, and rotating the antenna unit to an angle with a strongest signal according to the angle and signal strength mapping table after the electronic device is restarted.

6. The antenna controlling method according to claim 5, further comprising:
detecting whether an angle of the antenna unit has changed to a new angle; and
rotating the antenna unit to the angle with the strongest signal according to the angle and signal strength mapping table when the new angle of the antenna unit is greater than a second preset value.

7. The antenna controlling method according to claim 5, further comprising:
detecting a current signal strength of the antenna unit; and
rotating the antenna unit to record the signal strength in the preset angle for each rotation when the current signal strength drops below a first preset value, updating the angle and signal strength mapping table, and rotating the antenna unit to the angle with the strongest signal according to the updated angle and signal strength mapping table.

8. The antenna controlling method according to claim 5, further comprising:
presetting a verification time;
rotating the antenna unit after the verification time is reached to re-record the signal strength in the preset angle for each rotation;
updating the angle and signal strength mapping table; and
rotating the antenna unit to the angle with the strongest signal according to the updated angle and signal strength mapping table.

* * * * *